United States Patent [19]
Stutz

[11] Patent Number: 5,333,898
[45] Date of Patent: Aug. 2, 1994

[54] GAS BAG RESTRAINING SYSTEM FOR VEHICLES

[75] Inventor: Michael Stutz, Spraitbach, Fed. Rep. of Germany

[73] Assignee: TRW Repa GmbH, Alfdorf, Fed. Rep. of Germany

[21] Appl. No.: 109,665

[22] Filed: Aug. 20, 1993

[30] Foreign Application Priority Data

Aug. 25, 1992 [DE] Fed. Rep. of Germany ....... 9211423

[51] Int. Cl.$^5$ .............................................. B60R 21/20
[52] U.S. Cl. ........................... 280/730 A; 280/728 A; 280/743 R
[58] Field of Search ........... 280/730 A, 730 R, 728 R, 280/728 A, 743 R

[56] References Cited

U.S. PATENT DOCUMENTS

| | | | |
|---|---|---|---|
| 3,894,750 | 7/1975 | Eckels | 280/730 R |
| 3,897,961 | 8/1975 | Leising et al. | |
| 4,130,298 | 12/1978 | Shaunnessey | 280/730 R |
| 4,966,388 | 10/1990 | Warner et al. | 280/730 A |
| 5,265,903 | 11/1993 | Kuretake et al. | 280/730 A |

FOREIGN PATENT DOCUMENTS

| | | |
|---|---|---|
| 3422263 | 12/1985 | Fed. Rep. of Germany . |
| 2227979 | 11/1974 | France . |
| 1381999 | 1/1975 | United Kingdom . |
| 2191450A | 12/1987 | United Kingdom . |

OTHER PUBLICATIONS

Patent Abstracts of Japan, vol. 016, No. 111, Mar. 18, 1992; JP-A-03 281 459 published Dec. 12, 1991.
European Search Report No. EP 93 11 3479.

*Primary Examiner*—Eric Culbreth
*Attorney, Agent, or Firm*—Tarolli, Sundheim & Covell

[57] ABSTRACT

In a gas bag restraining system for a vehicle a gas (12) is folded up in the inactivated state in a housing (10) on the frame of a vehicle side window (4). The gas bag is adapted, when there is a collision, to be automatically inflated to unfold over at least a part of the area of the side window to afford lateral protection against impact for a vehicle occupant. The housing (10) of the gas bag (12) is located at one corner of the lateral window, which is constituted by two frame sections (6, 8), converging together at an angle, of the lateral window (4). Two elongated guide elements (16, 18) fixed to the vehicle extend respectively along the said frame sections (6, 8). A number of holding elements (20) for the gas bag (12) are adapted to run on each guide element (16, 18) for longitudinal sliding movement. The holding elements (20) are secured to the gas bag (12) along two lateral edges of the gas bag corresponding to the frame sections (6, 8).

3 Claims, 1 Drawing Sheet

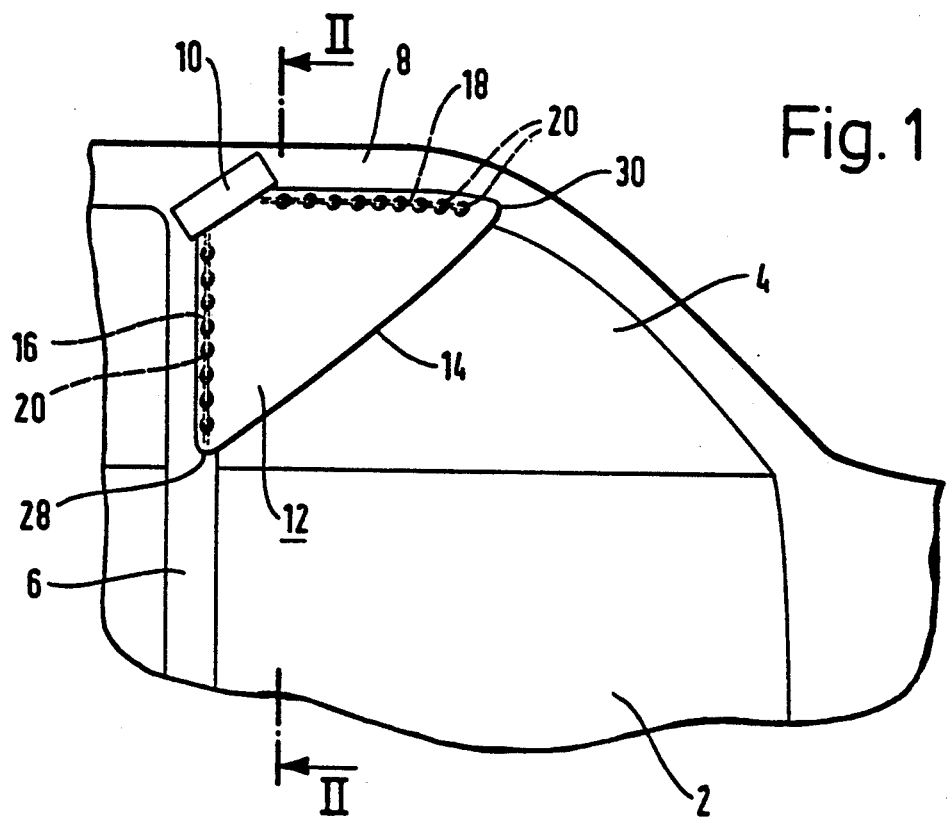
Fig. 1
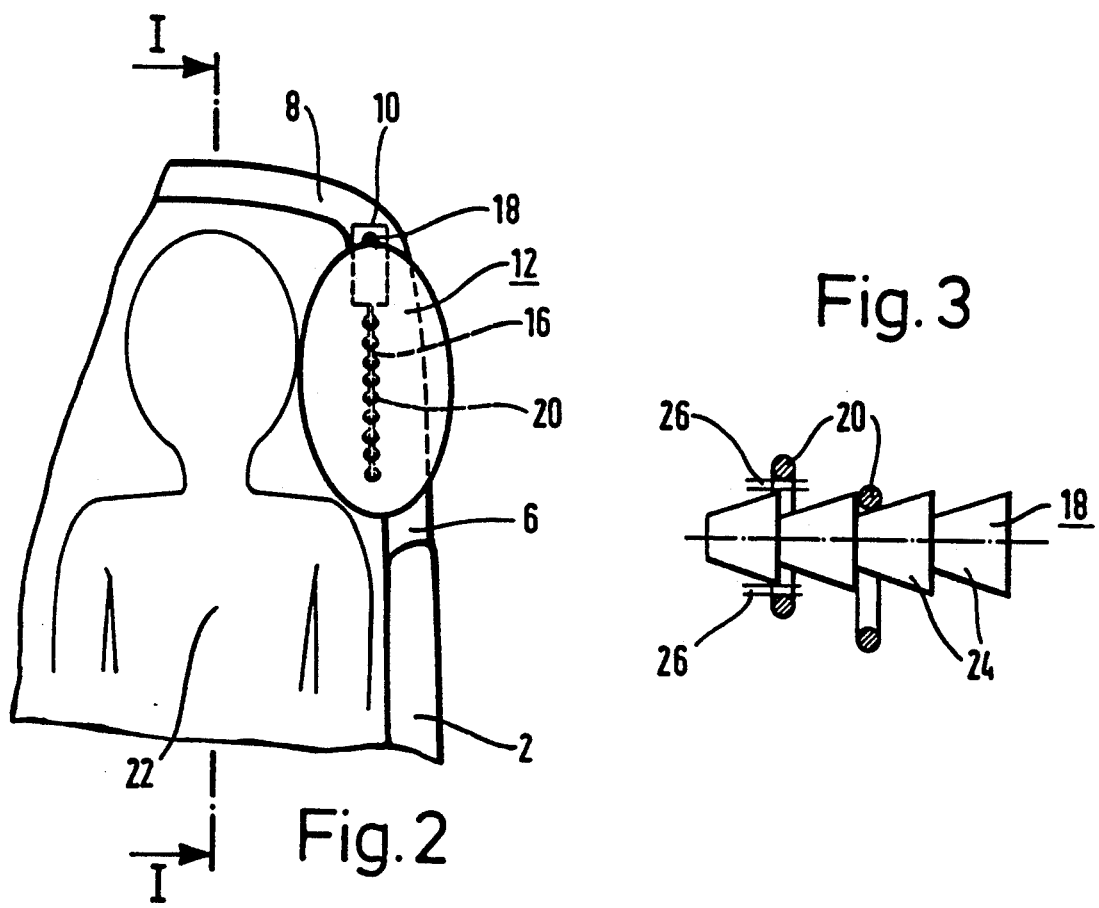
Fig. 2
Fig. 3

GAS BAG RESTRAINING SYSTEM FOR VEHICLES

The present invention relates to a gas bag restraining system for vehicles.

Restraining systems wherein a gas bag is unfolded in a hazard situation in front of a vehicle occupant have proved successful. However, they do not furnish any protection in the case of lateral collisions. A suggestion has consequently already been made to arrange inflatable cushions to the side of the vehicle occupants. Such cushions may provide additional protection in the case of secondary impact or of the vehicle's overturning.

In the case of having a gas bag to the side of the vehicle occupants, one possible position of mounting is on the frame of the side window and more particularly the roof end of the B pillar. When there is a collision it has to be possible for the gas bag to unfold towards the area of the lateral window if it is to provide effective protection, more particularly for the head and upper part of the body of vehicle occupants seated here. The unfolding of the gas bag can be controlled by the manner in which it is folded during assembly, influencing the opening of the housing or by guy cords extending in the interior of the gas bag to shape it. In conjunction with a laterally arranged gas bag there are however more stringent requirement as regards the action of such control means, since although expansion of the gas bag is to extend over a substantial part of the lateral window and in certain circumstances further side parts of the vehicle, it should not extend too far into the interior of the vehicle in order not to strike the head of a person sitting in the vehicle.

A further problem is due to the fact that the glass of the side windows of a vehicle is generally fractured in the case of a lateral collision with the result that such glass is no longer available for supporting any lateral gas bag.

One object the present invention is to provided such an improvement in a gas bag restraining system to be laterally arranged that unfolding of the gas bag is reliably controlled and the unfolded gas bag is effectively supported.

In accordance with the invention this object is to be attained by a gas bag restraining system for vehicles, comprising a gas bag which in the inactivated position is folded up in a housing on the frame of a vehicle side window and is adapted, when there is a collision, to be automatically inflated to unfold over at least a part of the area of the side window to constitute lateral protection against impact for a vehicle occupant, having the following features: The housing of the gas bag is located at one corner of the lateral window, which is constituted by two frame sections, converging together at an angle, of the lateral window; two elongated guide elements fixed to the vehicle extend respectively along the said frame sections; at least one holding element for the air bag is adapted to run on each guide element for longitudinal sliding movement; and the holding elements are secured to the gas bag along two lateral edges of the gas bag corresponding to the frame sections.

When the gas bag is folded up, all holding elements, on the side facing the housing of the gas bag system, of the guide elements are pushed together and are preferably concealed within the housing. Together with these holding elements the guide elements constitute a positive guide means for the unfolding of the gas bag. In the unfolded condition the gas bag is two-dimensionally connected with the guide elements. Therefore the gas bag encounters an effective support resisting the forces acting on it even if the lateral window is missing, more particularly because in its inflated condition it is quite rigid. The supporting action for the gas bag is even better if the guide elements are furnished with locking bodies which latch the holding elements to prevent return movement thereof towards the housing. In the case of a preferred working embodiment the guide elements are in the form of strands and extend through the annularly configured holding elements.

Further advantageous developments and convenient forms of the invention will be understood from the following detailed account of one embodiment thereof in conjunction with the accompanying drawings.

FIG. 1 is a view of part of the bodywork of a vehicle with an inflated lateral gas bag as seen from the interior of the vehicle.

FIG. 2 is sectional view generally along the line II—II of FIG. 1, which furthermore shows one vehicle occupant.

FIG. 3 is a sectional view of guide rod with ratchet teeth.

The view of FIG. 1 showing part of vehicle bodywork 2 comprises a lateral window 4, which may be a window which is to the fore or to the rear. A B pillar 6 and a section 8 of the roof of the vehicle bodywork form two frame sections, arranged at a right angle to each other, of the lateral window 4, at whose point of intersection a housing 10 is mounted for an inflating device, not illustrated, and for a gas bag 12. The gas bag 12 is folded up in the inactivated or neutral position of the system in the housing 10. In FIGS. 1 and 2 it is shown in the unfolded condition, in which it essentially occupies a triangular area extending over the lateral window. Two sides of the triangular area extend in parallelism to the B pillar 6 and the roof section 8. Its third side is an edge 14 remote from the housing 10, of the gas bag 12.

Two guide rods 16 and 18 in the form of round metal bars, are secured to the bodywork 2 of the vehicle. The guide rod 16 extends parallel to the B pillar 6, whereas the guide rod 18 extends parallel to the roof section 8. On each guide rod 16 and 18 a plurality of annular holding elements 20 of textile material, synthetic resin or metal are slipped. The holding elements 20 run freely along the guide rods 16 and 18. Furthemore the holding elements 20 on the gas bag 12 are secured along the two sides of the gas bag 12, which in the illustrated inflated condition extend in parallelism to the guide rods 16 and 18, for instance by being sewn on.

In its turgid, inflated condition the gas bag 12 constitutes, together with the holding elements 20 and the guide rods 16 and 18, a relatively rigid system, which even in the absence of a lateral window is able to reliably protect a vehicle occupant 22 against possible injuries following lateral impact, as shown in FIG. 2 in which like parts are denoted by the same reference numerals as in FIG. 1.

The system will be even more rigid if the guide rods 16 and 18 are furnished with latching bodies. In the case of the use of round guide rods 16 and 18 it is an advantage if they are designed as shown in section in FIG. 3 i.e. with a radially symmetrical saw-tooth configuration. The respectively frusto-conical latching bodies 24 do not prevent the expansion of the gas bag but they do reliably prevent return movement of the annular holding elements 20 after the expansion of the gas bag 12 towards the housing 10. The internal diameter of the holding elements 20 is somewhat larger than the external diameter of the guide rods 16 and 18. The resulting play 26 facilitates the unfolding of the gas bag 12, which will be described in the following.

Owing to the latching bodies it is possible for the air bag 12 as held by the guide rods 16 and 18 only to be slid or pivoted a relatively small distance out of its ideal position. More particularly the edge 14, illustrated in FIG. 1, of the gas bag 12 only gives way a small amount under load, more particularly because owing to the inertia of the holding elements 20 it can be pretensioned during speedy unfolding movement. The edge 14 extends between the end points 28 and 30 of the guide rods 16 and 18 diagonally through the lateral window 4.

In the case of a lateral gas bag system without guide rods and holding elements, whose housing is as well secured to the top end of the B pillar in order to save space, small occupants 22 of the vehicle would more particularly be at a disadvantage, since in the absence of a lateral window 4 the edge, illustrated in shown at the bottom in FIG. 2, of the gas bag 12 would be without any support at all. In the case of the system described in the present case this disadvantage does not occur.

The guide rods 16 and 18 and the holding elements 20 constitute not only an effective support or abutment for the inflated gas bag 12, but furthermore control its inflation as well. Starting from the collapsed or folded condition, in which the gas bag 12 and furthermore conveniently the holding elements 20 moved together at the ends, adjacent to the housing, of the guide rods 16 and 18, are concealed underneath the housing 10, the holding elements 20 are displaced on inflation of the gas bag 12 with a mutual increase in spacing towards the end points 28 and 30 of the guide rods 16 and 18. Owing to this positive guiding action the gas bag 12 unfolds in a completely controlled manner in the desired direction.

Furthermore instead of the guide rods 16 and 18 which are mounted in the illustrated working embodiment for the unfolding and holding of the gas bag 12 it is possible to use guide rails which are arranged in grooves.

I claim:

1. A gas bag restraining system for a vehicle, comprising a housing and a gas bag which in an inactivated state is folded up in said housing and is adapted, when there is a collision, to be automatically inflated to unfold, wherein
   a) said housing is located at a corner of a lateral vehicle window defined by two frame sections converging at an angle,
   b) two elongated guide elements extend respectively along said frame sections,
   c) said gas bag has a plurality of holding elements adapted to run on each guide element for longitudinal sliding movement,
   d) and said holding elements are secured to said gas bag along two lateral edges of said gas bag corresponding to said frame sections.

2. The gas bag restraining system as claimed in claim 1, wherein said guide elements are provided with latching bodies which permit movement of said holding elements away from said housing and prevent movement of said holding elements in an opposite direction.

3. The gas bag restraining system as claimed in claim 1, wherein said guide elements are rod-shaped and said holding elements are annular, said guide elements extending through said holding elements.

* * * * *